United States Patent Office 3,111,329
Patented Nov. 19, 1963

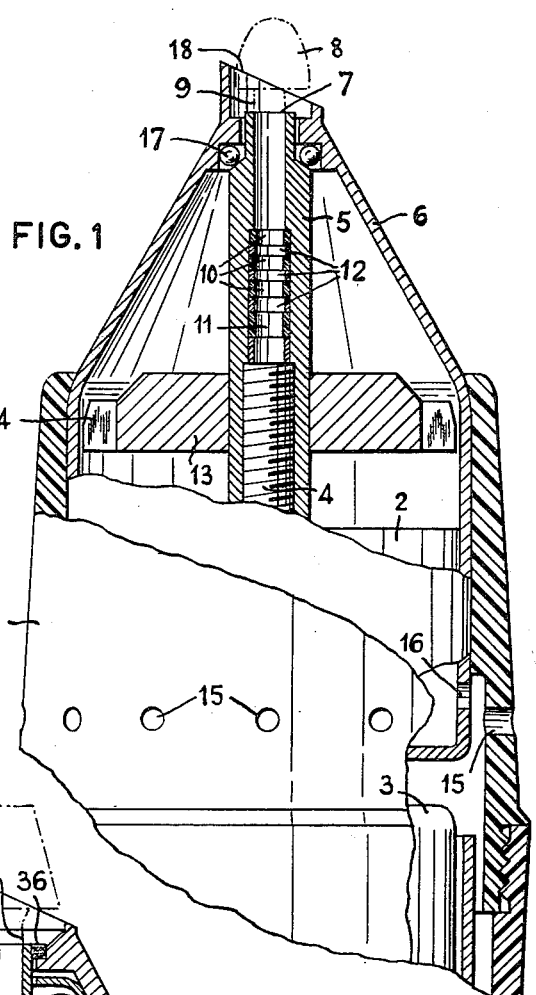
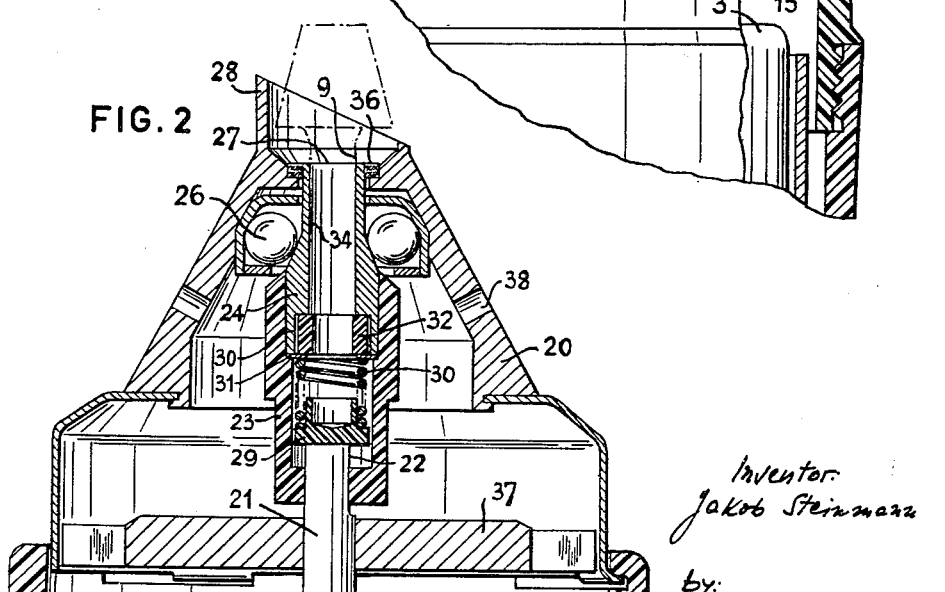

3,111,329
HAND APPARATUS WITH MOTOR DRIVE AND INTERCHANGEABLE TOOLS
Jakob Steinmann, Biel, Switzerland, assignor to Elpema A.G., Biel, Switzerland
Filed June 28, 1961, Ser. No. 135,390
Claims priority, application Switzerland June 30, 1960
11 Claims. (Cl. 279—102)

The present invention relates to hand apparatus with motor drive and interchangeable tools, each of which can be attached to the motor shaft by means of its stem.

Small appliances of this type, which are preferably designed for one-hand operations, are used more particularly for treating teeth, finger- and toenails, hard skin, or for fine machining of small workpieces by means of various rotating tools, such as drills, milling cutters, grinding and polishing heads, circular saws, and so on. These fine tools normally have a thin stem and are inserted into the driving shaft. In order to prevent the tool from sliding axially during operation and to prevent it from sliding when rotating under load, recesses have hitherto been provided on the stem of the tool for the cooperation of engaging means together with one or more flattenings alongside for the application of coupling means. These arrangements on the appliance on the one hand, and on the tool stem on the other hand, increase the cost of the appliance and tools very considerably and weaken the stem of the tool, which is frequently subjected to bending stresses.

The present invention has the object of obviating this disadvantage by disposing in the hollow part of the driving shaft, which receives a cylindrical part of the tool stem, internal rings of elastic material which are spaced axially apart and which constrict the hollow space in the shaft, these rings being elastically widened by the inserted cylindrical tool stem so that by friction they hold the tool stem fast against axial sliding and rotational slipping during operation.

The invention will now be explained with reference to two examples through which are illustrated in axial section in FIGURES 1 and 2 respectively of the accompanying drawings.

The hand appliance, part of which is illustrated in FIGURE 1, serves for example for the treatment of finger and toe nails of hard skin, and has an external housing 1 which is open at the top and which accommodates an electric motor 2, and an electric battery 3 as source of current. A driving shaft 4 is secured by means of a screwthread to a hollow shaft 5. This driving shaft 4, 5 is mounted at both ends in an internal housing 6 enclosing the motor 2, and having a conically tapered part projecting out of the open end of the housing 1. The hollow shaft 5 has an insertion aperture 7 which is accessible at the tapered end of the housing 6, and into which the relatively thin cylindrical shaft 9 of a tool 8 can be inserted. The hollow shaft contains three identical inner rings 10 of elastic (e.g., compression-elastic material, such as nylon), and an inner ring 11 of a different, comparatively soft, elastic material, such as polyvinyl chloride for example, these rings being spaced axially apart by the provision between the said inner rings of metallic intermediate rings 12 having a slightly greater inside diameter than that of the inner rings. All these rings 10–12 are held fast in an enlarged part of the bore 7 by the motor shaft 4 screwed into the hollow shaft 5. The inner rings 10 and 11 have an inside diameter smaller, by one to two tenths of a millimeter, than the bore 7 of the hollow shaft 5, serving for the radial supporting and centring of the tool stem 9, and are accordingly elastically widened on the insertion of the tool stem 9. The inner rings 10 are axially narrower than the inner ring 11 and in accordance with the nature of their material apply to the cylindrical surface of the inserted thin tool stem sufficient friction to hold the tool fast, mainly against axial sliding, while the axially wider inner ring 11 snugly engages frictionally the cylindrical stem surface and performs the duties of a drive for transmitting torque from the driving shaft to the tool. For the manual insertion or withdrawal of the tool a force must be applied which overcomes the friction of the stem on the inner rings.

On the hollow shaft 5 there is fastened a flywheel mass 13, on the outer periphery of which are provided fan blades 14 which during operation produce a current of air entering into the housing through apertures 15 and 16 and passing out at the tapered end of the housing 6 through a ball bearing 17 of the hollow shaft 5, this current of air being intended to prevent the penetration of abraded particles into the housing.

The housing 6 has an annular supporting edge 18 projecting axially beyond the insertion aperture 7 of the hollow shaft 5, the end face of this projection being in a plane inclined to the axis of the shaft. This inclined edge not only facilitates support of the object to be treated but also allows variation of its adjustment and its distance, in relation to the tool head, particularly in the case of milling cutters and grinders.

Instead of the electric battery a different source of current, for example connection to an alternating current supply, may be provided.

In the embodiment of the invention illustrated in FIGURE 2, a conically tapered two-part housing attachment 20 is detachably fitted into the opening in the housing 1 by means of a turning lock, e.g., a bayonet joint, while the motor shaft 21 mounted in two ball bearings (not shown) fits axially by its spindle 22 (which is flattened on its longer side), into the lower end of a drive sleeve 23. In the upper end of this sleeve 23 (which is preferably made of Nylatron plastic), there is inserted a conical sleeve 24, which is mounted by its cone in a ball bearing 26 provided in the housing attachment 20, and which by its cylindrical end extends through the insertion aperture 27 of the housing attachment 20 provided as previously with a bevelled collar edge 28. The drive sleeve 23 encloses a cup-shaped end cap 29, which is preferably made of Teflon plastic, and of which a thin-walled, extended cylinder neck is embraced by a partly compressed coil spring 30 which urges the axially movable end cap against the end face of the spindle 22. At the other end the spring 30 is supported against an intermediate ring 31 seated in a recess in the conical sleeve 24 beneath a ring 32 which is preferably made of soft PVC plastic. This ring 32 is more elastic than the end cap.

The inside diameters of the end cap 29 and of the ring 32 are somewhat smaller than the diameter of the stem 9 of the tool, which is inserted into the fitting bore 34 of the cone sleeve 24, and correspondingly elastically widens the end cap 29 and the ring 32 in order to be held fast axially and rotated thereby. A felt ring 36 protects the insertion aperture 27 against the penetration of abraded particles.

On the motor shaft 21 a fan impeller 37 is fastened which sucks cooling air through the housing 1 past the electric motor (not shown), while this air can pass out through the bores 38 in the housing attachment 20. The fan impeller serves at the same time as a flywheel mass, advantageous, more particularly, when the electric motor is driven by a battery.

It is apparent that the above-described structure of the invention can be applied to any desired motor-driven small apparatus for holding an interchangeable rotary tool. It will be understood that each of the elements described above, or two or more together, may also find a useful application in other types of rotary assemblies differing from the types described above.

While the invention has been illustrated and described as embodied in a hand apparatus with motor drive and interchangeable tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A hand appliance with motor drive and interchangeable tools, each of which can be attached by means of its stem to the driving shaft, comprising a hollow shaft open at one of its ends, adapted to receive a cylindrical part of the tool stem containing inner rings of elastic material which are spaced axially apart and resiliently supported in at least the axial direction away from said one end of said shaft, and which constrict the hollow space of the shaft, and are elastically widened by a cylindrical tool stem inserted therein so that by friction in operation the rings hold the said stem fast against axial sliding and rotational slipping.

2. A hand appliance as claimed in claim 1, wherein the inner rings are separated from one another by intermediate rings having a larger inside diameter.

3. A hand appliance as claimed in claim 1, wherein one of the inner rings consists of soft polyvinyl chloride and another of a synthetic plastic which is less elastic than polyvinyl chloride.

4. A hand appliance as claimed in claim 1, wherein between two inner rings having different elasticity there is disposed a co-axial coil spring, which supports with axial resiliency the inner ring of less elastic synthetic plastic, and snugly embraces a thin-walled, extensible part.

5. A hand appliance as claimed in claim 1, wherein the driving shaft comprises at the tool end a hollow shaft part connected to an inner solid shaft part, and the latter presses the inner and intermediate rings axially against one another in the hollow shaft part.

6. A hand appliance as claimed in claim 1, wherein the housing of the appliance projects axially beyond the insertion aperture of the driving shaft by an annular supporting edge, the end face of which is inclined in relation to the axis of the shaft.

7. A hand appliance as claimed in claim 6, wherein the annular supporting edge is provided on a conically tapered part of the housing which contains the hollow shaft and which is detachably fastened to a main housing of the apparatus by a turning lock, while the hollow shaft is mounted axially on the solid shaft part.

8. A hand appliance as claimed in claim 1 comprising a flywheel mass having fan blades on the driving shaft, for generating in the housing a current of air which cools the motor during operation.

9. An arrangement for holding an object having a stem-like portion, comprising, in combination, a shaft having a bore therein open at one end of said shaft; and at least one resilient substantially annular member mounted in said bore and adapted to have said stem-like portion forcefully inserted therein and then hold the inserted stem-like portion by frictional engagement, said resilient substantially annular member being resiliently supported in at least the axial direction away from said one end of said shaft, whereby during insertion of said stem-like portion said resilient substantially annular member may expand and yield in said axial direction and then contract again to grip said stem-like portion and thus hold said object firmly.

10. An arrangement for holding a tool having a stem, comprising, in combination, a shaft having a bore therein open at one end of said shaft; and at least one resilient substantially annular member mounted in said bore and having a central passage therethrough of a cross-sectional area slightly smaller than that of said stem and adapted to have said stem forcefully inserted therein, said resilient substantially annular member being resiliently supported in at least the axial direction away from said one end of said shaft, whereby during insertion of said stem said resilient substantially annular member may axially expand and yield and then contract again around said stem to grip the latter firmly.

11. An arrangement for holding a tool having a stem, comprising, in combination, a shaft having a bore therein open at one end of said shaft; at least one resilient substantially annular member mounted in said bore and having a central passage therethrough of a cross-sectional area slightly smaller than that of said stem and adapted to have said stem forcefully inserted therein; and resilient means positioned in said bore and engaging at least that end of said resilient substantially annular member which is remote from said one end of said shaft, whereby during insertion of said stem said resilient substantially annular member may axially expand and yield and then contract again around said stem to grip the latter firmly.

References Cited in the file of this patent

UNITED STATES PATENTS

| | | |
|---|---|---|
| 2,468,946 | Sherman | May 3, 1949 |
| 2,705,643 | Green | Apr. 3, 1955 |
| 2,720,735 | Ruehl et al. | Oct. 18, 1955 |
| 2,804,290 | Kaufman | Aug. 27, 1957 |